(12) United States Patent
Baik

(10) Patent No.: US 7,355,820 B2
(45) Date of Patent: Apr. 8, 2008

(54) HEAD DRUM ASSEMBLY FOR TAPE RECORDER AND METHOD OF ASSEMBLING THE SAME

(75) Inventor: Chung-hum Baik, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 421 days.

(21) Appl. No.: 10/995,130

(22) Filed: Nov. 24, 2004

(65) Prior Publication Data

US 2005/0117260 A1  Jun. 2, 2005

(30) Foreign Application Priority Data

Nov. 28, 2003  (KR) .................. 10-2003-0085522

(51) Int. Cl.
*G11B 5/52* (2006.01)
(52) U.S. Cl. .................. 360/271.6; 360/271.9; 360/130.24
(58) Field of Classification Search .. 360/271.1–271.7, 360/130.22–130.24
See application file for complete search history.

(56) References Cited

U.S. PATENT DOCUMENTS

| | | | | |
|---|---|---|---|---|
| 5,442,506 A | * | 8/1995 | Kang ................ | 360/271.2 |
| 5,808,841 A | * | 9/1998 | Edakubo et al. ...... | 360/271.1 |
| 6,487,054 B1 | * | 11/2002 | Choi et al. ........... | 360/271.1 |
| 7,054,112 B2 | * | 5/2006 | Baik et al. ........... | 360/271.2 |
| 7,139,155 B2 | * | 11/2006 | Lee et al. ............ | 360/271.2 |
| 2005/0286174 A1 | * | 12/2005 | Baik et al. ........... | 360/271.2 |

FOREIGN PATENT DOCUMENTS

| | | | | |
|---|---|---|---|---|
| EP | 1215664 A1 | * | 6/2002 | |
| JP | 06131605 A | * | 5/1994 | |
| JP | 06231437 A | * | 8/1994 | |
| JP | 11016133 A | * | 1/1999 | |
| JP | 11126317 A | * | 5/1999 | |
| JP | 11219549 A | * | 8/1999 | |
| JP | 11273039 A | * | 10/1999 | |
| JP | 2000-358350 | | 12/2000 | |
| JP | 2001344721 A | * | 12/2001 | |
| JP | 2001351213 A | * | 12/2001 | |
| JP | 20-3088533 | | 6/2002 | |
| JP | 2003077110 A | * | 3/2003 | |
| KR | 20-0154521 | | 4/1998 | |
| KR | 1998-0054845 | | 10/1998 | |
| KR | 1998-0058832 | | 10/1998 | |
| KR | 1999-0005577 | | 2/1999 | |

* cited by examiner

*Primary Examiner*—William J Klimowicz
(74) *Attorney, Agent, or Firm*—Roylance, Abrams, Berdo & Goodman, L.L.P.

(57) ABSTRACT

A head drum assembly for a tape recorder maintains a substantially constant preload and reduces manufacturing costs. The head drum assembly includes a shaft fixed to a center of a stationary drum, a rotary drum installed to an upper portion of the stationary drum to be rotated by the shaft and having a rotor, a stator installed to an upper portion of the rotary drum to face the rotor, a bearing interposed between the shaft and the rotary drum that rotatably supports the rotary drum, a spring resiliently supporting an inner race of the bearing, and a drum cover fixed with the stator and fixed to the shaft to apply a substantially constant pressure to the bearing and to substantially constantly maintain a spacing between the stator and the rotor.

14 Claims, 4 Drawing Sheets

HEAD DRUM ASSEMBLY FOR TAPE RECORDER AND METHOD OF ASSEMBLING THE SAME

CROSS REFERENCE TO RELATED APPLICATION

This application claims the benefit under 35 U.S.C. § 119(a) of Korean Patent Application No. 2003-85522, filed on Nov. 28, 2003, the entire contents of which are expressly incorporated herein by reference.

BACKGROUND OF THE INVENTION

1. Field of the Invention

The present invention relates to a tape recorder. More particularly, the present invention relates to a head drum assembly for a tape recorder and a method of assembling the same that urges a rotary drum at a constant pressure and maintains a constant spacing between a rotor and a stator.

2. Description of the Related Art

In general, a tape recorder, such as a video cassette tape recorder or a camcorder, operates to record and reproduce image and sound data on and from a magnetic tape that is wound around a pair of reels and is moved along a certain path. Such a tape recorder includes a head drum assembly for writing or reading a signal on or from the magnetic tape by scanning of a magnetic head rotated at high speed.

FIG. 1 shows one example of a conventional head drum assembly for a tape recorder.

Referring to FIG. 1, the head drum assembly includes a stationary drum 1, a shaft 3 fixed to a center of the stationary drum 1, a rotary drum 7 installed to an upper portion of the stationary drum 1 and rotated by the shaft 3, and a drum cover 13 installed to an upper portion of the rotary drum 7 and fixed to the shaft 3. The rotary drum 7 is rotatably supported on the shaft by two ball bearings 11, and includes a magnetic head 9 for writing the signal on the magnetic tape or reading the signal from the magnetic tape. Rotary transducers 5 are installed to a lower portion of the rotary drum 7 and the upper portion of the stationary drum 1 to transmit or receive the signal to or from the magnetic head 9 in such a way that the transducers are facing one another. A rotor 20, which is a component of a motor, is fixed to the upper portion of the rotary drum 7. A stator 21 is positioned opposite the rotor 20 and connected to a lower portion of the drum cover 13, so that the rotary drum 7 is rotated by operation of the motor.

In order to stably rotate the rotary drum 7, the rotary drum 7 is installed such that a constant preload is applied to the ball bearings 11 supporting the rotary drum 7. According to a conventional method of applying the preload to the ball bearing 11, a protrusion 15 is formed on a lower surface of the drum cover 13 to press an inner race of the ball bearing 11. After the protrusion 15 is inserted into the shaft 3, a certain weight is positioned on the upper portion of the drum cover 13 such that the protrusion 15 applies the preload to the ball bearing 11. Then, the drum cover 13 is fixed to the shaft 3 by means of a fastening element 17, such as a screw. As such, the drum cover 13 presses the inner race of the ball bearing 11 at a constant pressure so that the ball bearing 11 is constantly preloaded.

In this situation, supplying power to the stator 21 of the motor rotates the rotor 20, which causes the rotary drum 7 to rotate at a fast speed. The magnetic head 9 fixed to the rotary drum 7 transmits and receives the signal to and from a controller of the tape recorder through a rotary transducer 5 to write the signal on the magnetic tape or read the signal from the magnetic tape.

Rotating the rotary drum 7 at a high speed generates an increasing amount of force on the rotary drum 7. A preload acting on the ball bearing 11 at the rotation of the rotary drum is different from the preload predetermined at a stationary state of the rotary drum. Specifically, the preload set to stably rotate the rotary drum 7 is varied, thereby causing the rotary drum 7 to be unstable.

In addition, since the preload is constantly applied to the ball bearing 11 by pressing the inner race of the ball bearing 11 with the protrusion 15 of the drum cover 13, the spacing between the stator 21 and the rotor 20 that form the motor is varied depending upon machining dimensions of the drum cover 13 and assembling tolerances of the rotary drum 7. Thus, a problem exists because the spacing between the stator and the rotor is not constant in every head drum assembly.

Also, a control circuit board 23 is fixed to the drum cover 13, as well as being fixed to the stator of the motor 21. The method of fixing the drum cover 13 to the shaft 3 using the screw 17 may cause signals, for example, FG signals, PG signals, etc., for controlling the motor (that is, FG. PG, etc) to be unbalanced due to the circuit board being distorted of the circuit board occurring during fastening of the screw 17.

SUMMARY OF THE INVENTION

An aspect of the present invention is to provide a head drum assembly for a tape recorder and a method of assembling the same that are capable of substantially constantly applying a preload to a ball bearing.

Another object of the present invention is to provide a head drum assembly for a tape recorder and a method of assembling the same that maintains a substantially constant spacing between a stator and a rotor of a motor, thereby preventing an unbalance of a motor control signal.

The foregoing and other objects and advantages are substantially realized by providing a head drum assembly for a tape recorder, according to the present invention, including a shaft fixed to a center of a stationary drum; a rotary drum installed to an upper portion of the stationary drum to be rotated by the shaft, and having a rotor; a stator installed to an upper portion of the rotary drum to face the rotor; a bearing, interposed between the shaft and the rotary drum, for rotatably supporting the rotary drum; a spring for resiliently supporting an inner race of the bearing; and a drum cover fixed to the stator, being fixed to the shaft to urge the bearing at a constant pressure and to constantly maintain a spacing between the stator and the rotor. Preferably, the drum cover is pressed into the shaft.

According to another aspect of the present invention, there is provided a method of assembling a head drum assembly for a tape recorder for assembling a stator assembly to a drum subassembly assembled to a shaft of a rotary drum, the method including the steps of measuring a height from a reference plane of the drum subassembly to an upper surface of a rotor and a height from a reference plane of the stator assembly to an upper surface of the stator; calculating a distance of the stator assembly to be pressed into the shaft using measured values; assembling a spring to the shaft; and performing a cold press-in of the shaft with respect to the stator assembly for a press-in distance calculated in the above step.

According to the head drum assembly of an embodiment of the present invention, the bearing is preloaded by the spring, and the preload is substantially constantly maintained during rotation of the rotary drum.

In addition, since the drum cover is fixed through the preload of the spring and the cold press-in process, a spacing between the stator and the rotor is substantially constantly maintained, so that there is substantially no deflection of the motor control signal.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
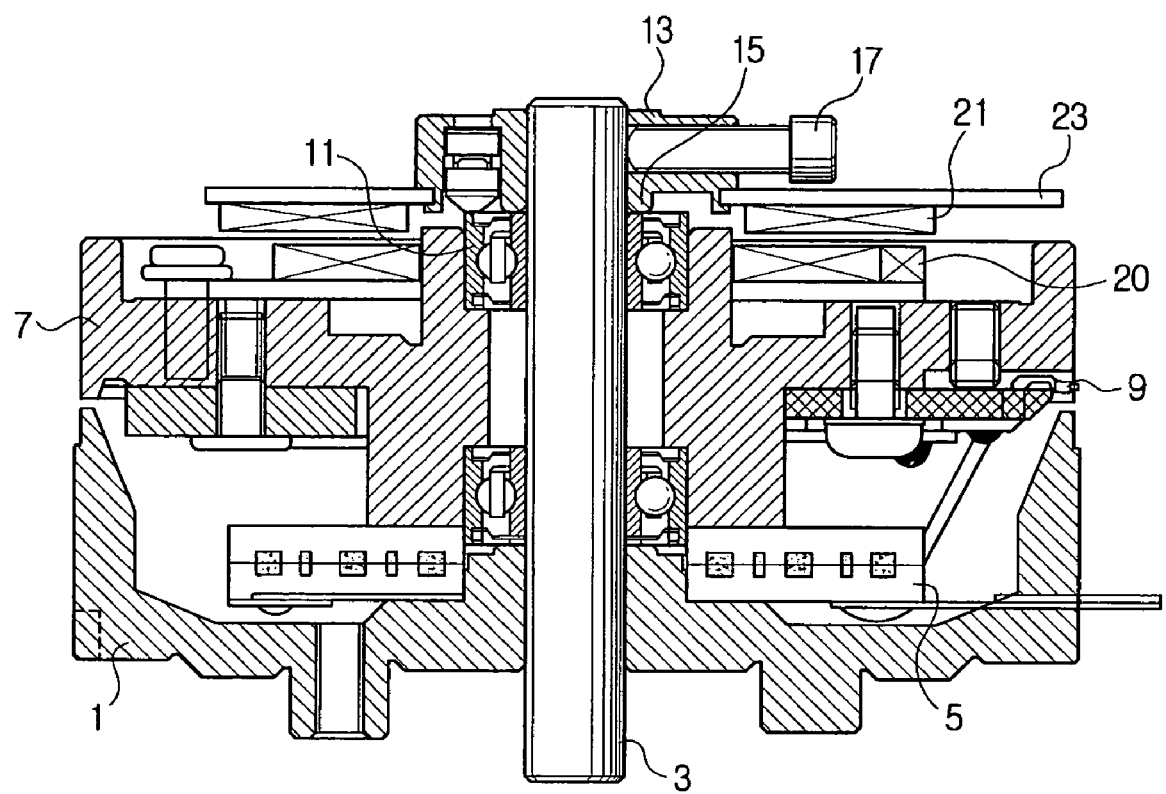
FIG. 1 is a cross-sectional view of a conventional head drum assembly for a tape recorder.

In the following description, identical drawing reference numerals are used for the same elements throughout the drawings. The matters defined in the description such as a detailed construction and elements are provided to assist in a comprehensive understanding of the embodiments of the invention. Thus, it is apparent that the embodiments of the present invention may be carried out without those defined matters. Also, well-known functions or constructions are not described in detail since they may obscure the invention with unnecessary detail.

Figure 2:
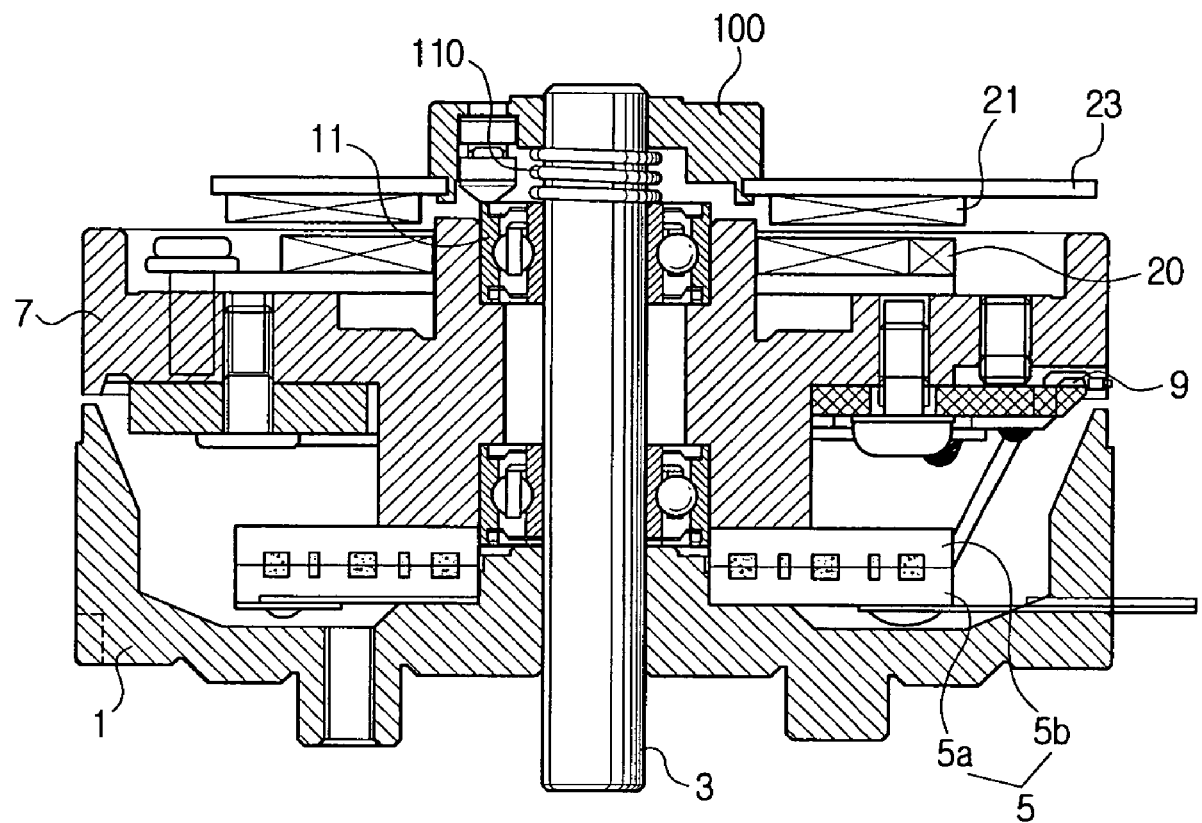
FIG. 2 is a cross-sectional view of a head drum assembly for a tape recorder according to an embodiment of the present invention.

Referring to FIG. 2, a head drum assembly includes a stationary drum 1, a shaft 3 fixed to a center of the stationary drum 1, a rotary drum 7 installed to an upper portion of the stationary drum 1 and rotated by the shaft 3, and a drum cover 100 installed to an upper portion of the rotary drum 7.

The stationary drum 1 is fixed to a deck (not shown) of the tape recorder, and a fixed portion 5a of the rotary transducer 5 is installed to an upper surface of the stationary drum 1. The shaft 3 is fixed to a center of the stationary drum 1 to support rotation of the rotary drum 7. A pair of bearings 11 are generally interposed between the shaft 3 and the rotary drum 7, thereby causing the rotary drum 7 to rotate around the shaft 3 at high speed. Preferably, the bearings 11 include a pair of high performance ball bearings, as shown in FIG. 2. A rotary portion 5b of the rotary transducer 5 corresponding to the fixed portion of the rotary transducer 5a of the stationary drum 1 is positioned at a lower portion of the rotary drum 7. A magnetic head 9 for writing/reading the signal on/from the magnetic tape is positioned at an outside of the rotary drum 7

The drum cover 100 is inserted and fixed to an upper end of the shaft 3 by any suitable means, such as through cold press-in. A motor control circuit board 23 including a stator 21 of the motor is fixed to a lower periphery of the drum cover 100. The shaft 3 receives a resilient member 110 that is substantially interposed between the drum cover 100 and the rotary drum 7. Preferably, the resilient member 110 is a compression spring, as shown in FIG. 2. The compression spring 110 has a diameter to press an inner race of the ball bearing 11 supporting the rotary drum 7. Also, the compression spring 110 has a rigidity and a length sufficient to generate a biasing force to press the inner race of the ball bearing 11 with a constant pressure when the spacing between the stator 21 and the rotor 20 is substantially constantly maintained. Accordingly, if the drum cover 100 is installed to the shaft 3 to space the stator 21 of the drum cover 100 and the rotor 20 of the rotary drum 7 at a substantially constant spacing, the ball bearing 11 of the rotary drum 7 is substantially constantly preloaded by the spring 110.

A process of assembling the head drum assembly having the above components for the tape recorder will now be described in detail with reference to FIGS. 3 through 5.

The stationary drum 1 and the rotary drum 7 are inserted on the shaft 3 to prepare a drum subassembly by any suitable conventional method. The motor control circuit board 23 with the stator 21 fixed thereto is secured to the drum cover 100 to prepare the stator assembly (step S10 of FIG. 5).

Figure 3:
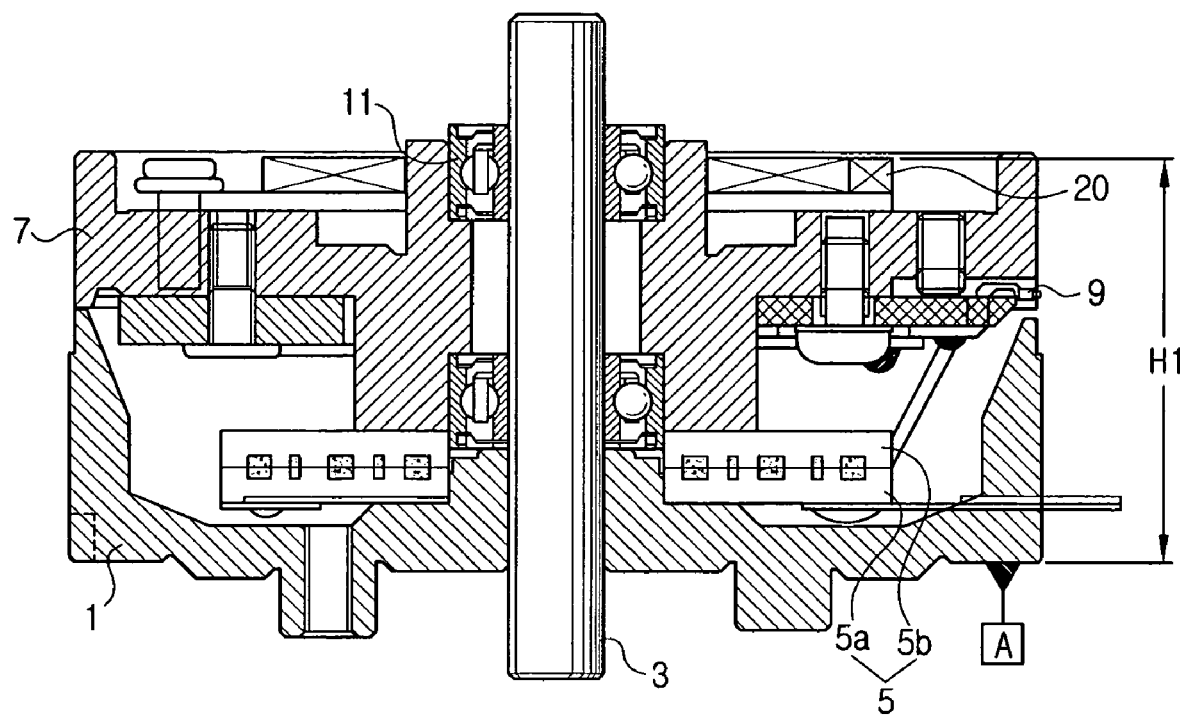
FIG. 3 is a cross-sectional view depicting one example of measuring a height of a rotor in the drum subassembly.

Then, a height H1 from a reference plane A of the drum subassembly to an upper surface of the rotor 20 is measured, as shown in FIG. 3. Although the reference plane of the drum subassembly may be optionally selected, the lower periphery A(FIG. 3) of the stationary drum 1 is selected as the reference plane in this embodiment. Accordingly, a height (H1, referred to as the rotor height) from the surface A to the upper surface of the rotor 20 is measured (step S20).

Figure 4:
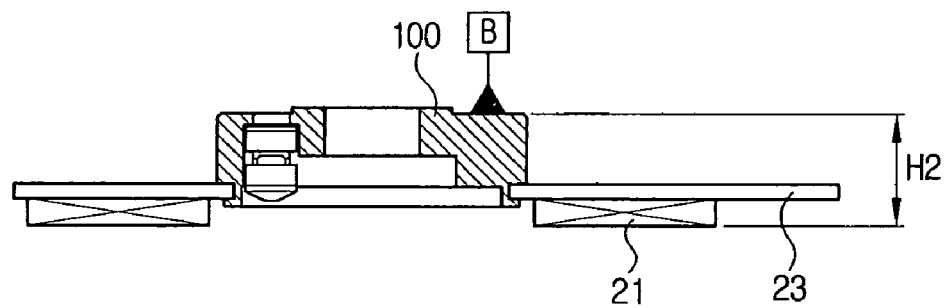
FIG. 4 is a cross-sectional view depicting one example of measuring a height of a stator in the drum subassembly.
Figure 5:
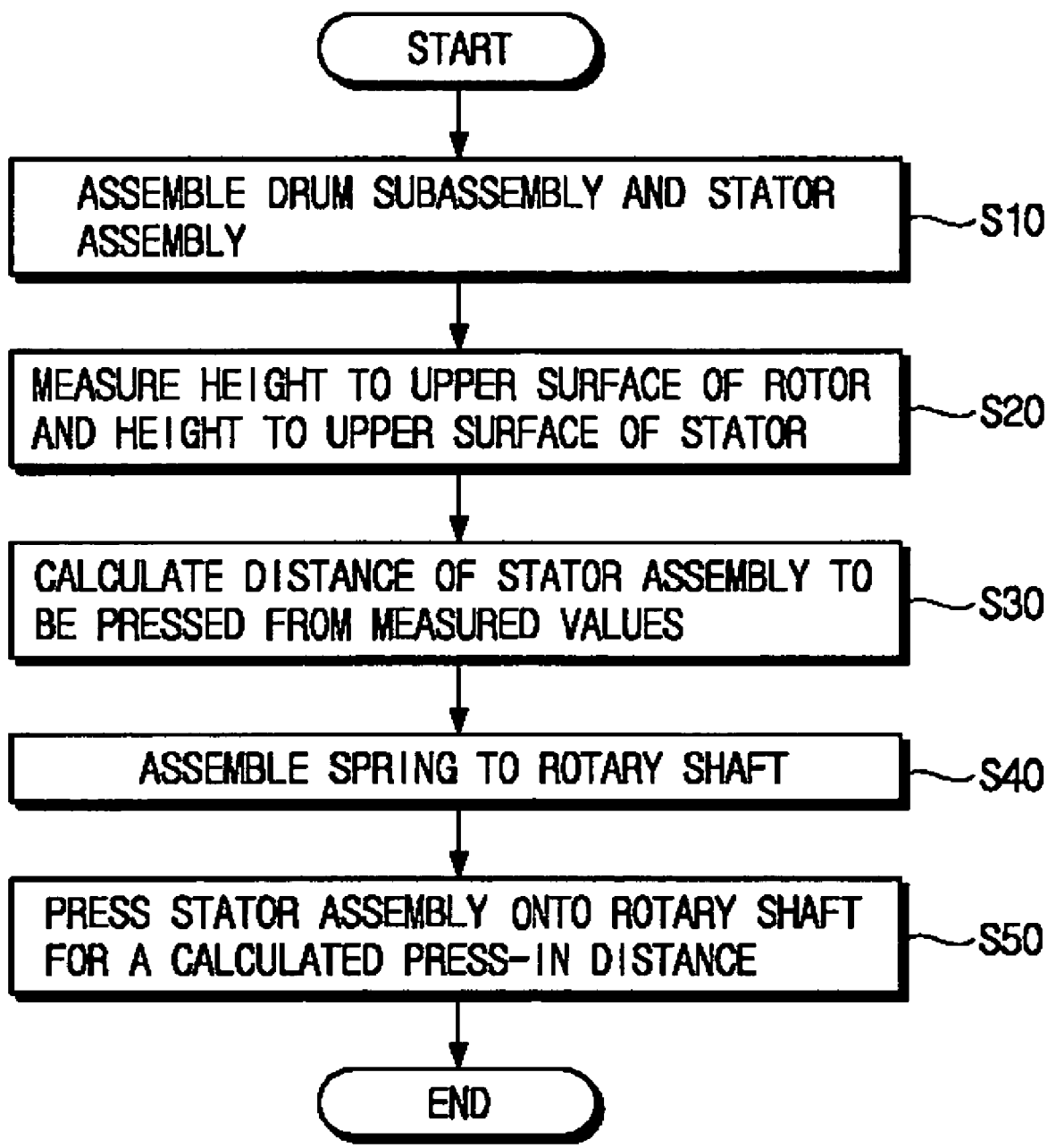
FIG. 5 is a flowchart depicting a method of assembling a head drum assembly for a tape recorder according to an embodiment of the present invention.

Then, a height H2 from a reference plane B of the stator assembly to an upper surface of the stator 21 is measured, as shown in FIG. 4. Although the reference plane of the stator assembly may be optionally selected, an upper periphery B (FIG. 4) of the drum cover 100 is selected as the reference plane in this embodiment. Accordingly, a height (H2, referred to as the stator height) from the surface B to the upper surface of the stator 21 is measured (step S20).

Then, a distance of the stator assembly to be pressed into the drum subassembly is calculated by use of the measured rotor height H1 and stator height H2 (step S30). At this time, a defined spacing between the stator 21 and the rotor 20 is considered. A method of calculating the distance of the cold press-in is substantially similar to the conventional method of measuring the spacing between the stator and the rotor, and thus the detailed description thereof is omitted.

After the drum subassembly is mounted to a press-in jig, the spring 110 is installed onto the rotary shaft 3 (step S40). The stator assembly is inserted onto the upper end of the shaft 3, and is cold-pressed for the predetermined press-in distance calculated in step S30 (step S50). At this time, since the drum cover 100 is being forcibly inserted onto the shaft 3, the drum cover 100 is not being pushed by the spring 110.

Supplying power to the stator 21 of the head drum assembly assembled according to the above process rotates the rotor 20. The rotation of the rotor 20 causes the connected rotary drum 7 to rotate at a fast speed. As such, the magnetic head 9 writes or reads the signal on or from the magnetic tape running along the head drum assembly by the rotation of the rotary drum 7.

Since the ball bearing 11 supporting the rotary drum 7 is receiving a substantially constant pressure from the spring 110, the same preload may be maintained on the ball bearing 11 during the rotation of the rotary drum 7. Therefore, the rotary drum 7 is substantially stably rotated. Also, since the stator 21 and the rotor 20 are connected with substantially constant spacing being maintained therebetween, the spacing between the stator 21 and the rotor 20 is substantially constantly maintained irrespective of the machining tolerance of the drum cover 100 or assembling tolerance of the drum subassembly.

In addition, since the drum cover 100 with the motor control circuit board 23 assembled thereto is pressed onto the shaft 3 without using a screw or similar fastener, there is no deflection of a motor controlling signal due to distortion of the circuit board.

In particular, since the drum cover 100 does not have a threaded hole for a screw, manufacturing costs are reduced.

The foregoing embodiment and advantages are merely exemplary and are not to be construed as limiting the present invention. The present teaching may be readily applied to other types of apparatus. Also, the description of the embodiments of the present invention is intended to be illustrative, and not to limit the scope of the claims, and many alternatives, modifications, and variations will be apparent to those skilled in the art.

What is claimed is:

1. A head drum assembly for a tape recorder, comprising:
   a shaft fixed to a center of a stationary drum;
   a rotary drum rotatably disposed on the shaft and installed on an upper portion of the stationary drum, the rotary drum having a rotor;
   a stator installed on an upper portion of the rotary drum to face the rotor;
   a bearing disposed between the shaft and the rotary drum to rotatably support the rotary drum;
   a resilient member to resiliently support the bearing;
   a drum cover connected to the stator and press fitted on the shaft to apply a substantially constant pressure on the bearing and to maintain a substantially constant spacing between the stator and the rotor; and
   a circuit board connected to the drum cover, the drum cover and the circuit board being secured to the shaft without the use of a fastener.

2. The head drum assembly as claimed in claim 1, wherein the resilient member is a spring.

3. The head drum assembly as claimed in claim 2, wherein the spring is a compression spring.

4. The head drum assembly as claimed in claim 2, wherein the spring resiliently supports an inner race of the bearing.

5. The head drum assembly as claimed in claim 1, wherein the circuit board is connected to the drum without the use of a fastener.

6. A head drum assembly for a tape recorder, comprising:
   a shaft;
   a rotary drum rotatably disposed on the shaft;
   a rotor secured to the rotary drum;
   a first bearing assembly rotatably disposed between the rotary drum and the shaft;
   a resilient member disposed on the shaft;
   a drum cover press fitted to the shaft, the resilient member being positioned between the drum cover and the first bearing assembly to apply a substantially constant pressure on the first bearing assembly; and
   a circuit board connected to the drum cover, the drum cover and the circuit board being secured to the shaft without the use of a fastener.

7. The head drum assembly as claimed in claim 6, wherein the resilient member is a spring.

8. The head drum assembly as claimed in claim 7, wherein the spring is a compression spring.

9. The head drum assembly as claimed in claim 6, wherein the resilient member applies pressure to an inner race of the first bearing assembly.

10. The head drum assembly as claimed in claim 6, wherein a stator is connected to the drum cover, the resilient member maintaining substantially constant spacing between the stator and the rotor.

11. The drum assembly as claimed in claim 6, wherein a stator is connected to the circuit board, the resilient member maintaining substantially constant spacing between the stator and the rotor.

12. The drum assembly as claimed in claim 6, wherein a stationary drum is secured to the shaft on an opposite side of the rotary drum from the drum cover.

13. The drum assembly as claimed in claim 6, wherein a second bearing assembly is rotatably disposed between the shaft and the rotary drum.

14. The head drum assembly as claimed in claim 6, wherein the circuit board is connected to the drum without the use of a fastener.

* * * * *